United States Patent Office 3,291,662
Patented Dec. 13, 1966

3,291,662
COMPOUND AND COMPOSITION CONTAINING AMMONIA, HYDRAZINE, AND DECABORANE(8)
Walter H. Knoth, Jr., Mendenhall, Pa., assignor to E. I. du Pont de Nemours and Company, Wilmington, Del., a corporation of Delaware
No Drawing. Filed July 17, 1962, Ser. No. 210,881
12 Claims. (Cl. 149—22)

This invention relates to nitrogen-containing boron compounds. More particularly, it concerns boron compounds containing hydrazine and their preparation.

Compositions which contain hydrazine and boron compounds have found application in recent years in the field of high energy fuels. The available compositions are deficient in a number of properties which are desired for satisfactory operations. Compositions are needed, for example, which possess improved stability during handling and which have controllable oxidation rates.

It is an object of the present invention to provide boron-containing compositions which have superior stability against thermal and oxidative decomposition. It is another object to provide high energy fuels having such superior stability. Other objects will become apparent hereinafter.

The compositions of the present invention consist of a compound of the empirical formula $B_{10}H_{15}N_3$, its fluid mixtures with hydrazine and its salts with metals.

The composition of the empirical formula $B_{10}H_{15}N_3$ is defined further as a chemical compound of 1 mole of decaborane(8), 1 mole of hydrazine and 1 mole of ammonia. It is represented by the formula $$NH_2NH_2 \cdot B_{10}H_8 \cdot NH_3$$

and it can be called ammonia-hydrazine-decaborane(8) where the numeral in parenthesis represents the number of hydrogen atoms bonded to boron atoms.

The compound is readily soluble in hydrazine and these solutions are stable. In fact, the compound is prepared conveniently in hydrazine to obtain solutions directly which contain up to 50% or more by weight of of the compound. The solutions in hydrazine form part of this invention.

The compound, $NH_2NH_2 \cdot B_{10}H_8 \cdot NH_3$, is weakly acidic and, in the presence of strong bases, it behaves as a monobasic acid. It forms salts of the formula $M(B_{10}H_{14}N_3)_b$ where M is a metal (or, more specifically, a cation obtained from a metal), preferably of Groups I and II of the Periodic Table; $(B_{10}H_{14}N_3)$ is the monovalent anion obtained from the compound $NH_2NH_2 \cdot B_{10}H_8 \cdot NH_3$ by loss of 1 proton; and $b$ is a positive whole number equal to the valence of M. In an especially preferred group of salts M is an alkali metal or thallium. The formulas for the metal salts can also be written generically as 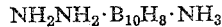$M(NH_2NHB_{10}H_8 \cdot NH_3)_b$ where M and $b$ are defined as above. For compounds in which M is an alkali metal or thallium, the value of $b$ is 1 and the formula is, therefore, $M(NH_2NHB_{10}H_8 \cdot NH_3)$. The alkali metals includes Li, Na, K, Rb and Cs. The salts are white crystalline products and they form part of this invention.

The compound, $NH_2NH_2 \cdot B_{10}H_8 \cdot NH_3$, will be referred to as the parent compound. It is obtained simply and conveniently by reacting hydrazine with bis(diazonium)decaborane(8).

The parent compound is a white crystalline product which is moderately soluble in hydroxylated solvents, e.g., water, methyl alcohol, ethyl alcohol and the like. It is soluble, as stated earlier, in hydrazine and in substituted hydrazines, e.g., methylhydrazine, 1,1-dimethylhydrazine, 1,2-dimethylhydrazine, phenylhydrazine and the like. The compound, when isolated from solution in hydrazine, may contain up to 8 or more molecules of hydrazine as solvent of crystallization. The solvated products are included within the scope of the compounds of the invention.

The metal salts of the invention are also white crystalline products. The alkali metal salts are quite soluble in water and the solutions are basic, as is to be expected of salts of strong bases with weak acids.

The hydrazine solutions of the parent compound are clear fluids at atmospheric temperatures. A particular advantage of these solutions is the high boron content which is obtained at relatively low concentrations. To illustrate, a solution of about 25% by weight of the parent compound contains 15–16% boron; in contrast, a solution of about 25% by weight of $NH_2NH_3BH_4$ contains 5–6% boron.

The parent compound, its solutions in hydrazine and its metal salts, as defined above, are stable at conventional atmospheric temperatures and pressure. The compound, its solutions and its salts can be stored in closed containers with corrosion-resistant inner surfaces to avoid contamination from surfaces which are subject to chemical attack. Containers of glass, stainless steel, poly(tetrafluoroethylene) resin and the like can be employed.

The parent compound, $NH_2NH_2 \cdot B_{10}H_8 \cdot NH_3$, is prepared simply by warming a mixture of hydrazine and $B_{10}H_8 \cdot 2N_2$ for a time sufficient to replace both $(N_2)$ groups. The reaction proceeds rapidly and the rate of the reaction is, of course, increased by warming. The parent compound is obtained in solution in hydrazine and this solution can be used directly if desired. Evaporation of the hydrazine yields the compound as a crystalline solid containing hydrazine of crystallization.

Hydrazine, employed as one reactant, is a commercially available product. The product, as purchased, can be used directly and it need not be especially purified.

The boron compound, $B_{10}H_8 \cdot 2N_2$, is not readily available and its preparation is described fully in Example A.

The reaction of $B_{10}H_8 \cdot 2N_2$ and hydrazine is conducted in conventional corrosion-resistant vessels which are equipped with a means of stirring and facilities for heating or cooling. The reactants are charged into the vessel, the mixture is stirred and heat is applied, generally in sufficient amount to cause the hydrazine to reflux (ca. 113–115° C.)

The reaction is preferably conducted in an inert, i.e., non-oxidizing, atmosphere and the reaction vessel is generally flushed with an inert gas prior to heating the mixture. Inert gases which can be employed are nitrogen, argon, helium and the like.

The temperature at which the process is operated is not critical. For economic reasons, it is preferable to heat the mixture and thus bring the reaction to completion in a short time. The preferred temperature range lies between about 80° C. and the boiling point of hydrazine.

Pressure is not a critical factor in the process. The reaction is conducted most conveniently at atmospheric pressure although pressures higher or lower than atmospheric can be employed.

The time of the reaction is determined largely by the other factors (e.g., temperature and efficiency of mixing) in the process and by the type of process, i.e., batch or continuous. In a continuous process, a slurry of hydrazine and $B_{10}H_8 \cdot 2N_2$ can be passed through a feed line into a heated chamber and the solution of

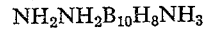
$$NH_2NH_2B_{10}H_8NH_3$$

in hydrazine can be removed by appropriate means after a short period of travel in the chamber. The time of reaction will thus be short, e.g., in terms of seconds. In a batch process, the time will generally be longer, e.g., from about 10 minutes to 1 hour or longer.

The ratio of reactants is not critical. Customarily, the hydrazine is used in excess to provide a fluid reaction mixture. The ratio, moles hydrazine/moles $B_{10}H_8 \cdot 2N_2$, will generally lie between 1 and 50, preferably between 1 and 25.

It is apparent that solutions of $NH_2NH_2 \cdot B_{10}H_8 \cdot NH_3$ in hydrazine covering a broad range of compositions can be obtained in the above process by variation in the mole ratio of reactants. Thus, by employing a large excess of hydrazine, dilute solutions of $NH_2NH_2 \cdot B_{10}H_8 \cdot NH_3$ are obtained, e.g., solutions containing 5% or less of the parent compound. In the event only a small excess of hydrazine is employed in the process, concentrated solutions of $NH_2NH_2 \cdot B_{10}H_8 \cdot NH_3$ in hydrazine are obtained, e.g., solutions containing up to 50% or more of the parent compound.

Of course, the parent compound can be isolated, if desired, by removal of the hydrazine from the reaction mixture through evaporation. Solutions of accurately controlled composition can then be made from the pure product. Thus, compositions can be obtained containing as little as 0.1% to as much as 50% by weight or more of $NH_2NH_2 \cdot B_{10}H_8 \cdot NH_3$ in hydrazine.

Salts of the formula $M(NH_2NHB_{10}H_8 \cdot NH_3)$ are obtained by dissolving the parent compound in an aqueous solution of an alkali metal hydroxide or of thallium hydroxide. The solutions can be concentrated by evaporation until the salt separates. The concentration of metal hydroxide in the aqueous solution used as a reactant is not critical. It may range from 1% to as high as 20% but, normally, solutions containing 2–10% by weight of alkali metal hydroxide are employed. The process is conducted by well-known conventional methods and a detailed description is not necessary.

The thallium salt can, if desired, be prepared by reacting a solution of an alkali metal salt, obtained as described in the preceding paragraph, with a thallium salt, e.g., TlF, TlNO$_3$, TlOH and the like.

The compositions of the invention and their preparation are illustrated further by the examples which follow.

EXAMPLE A

A. *Preparation of bis(dimethylsulfide)decaborane(12)*

A reaction vessel having a capacity of about 365 parts of water is charged with 0.79 part of $B_{10}H_{14}$, cooled in liquid nitrogen, and then evacuated to a pressure of 10 microns of mercury. Approximately 21 parts of methyl sulfide is condensed onto the $B_{10}H_{14}$ in the reaction vessel. The reaction vessel is closed, allowed to warm to room temperature (ca. 25° C.) and stand for 4 days. During this period, 6.6 millimoles of hydrogen is evolved. The reaction vessel is opened and excess methyl sulfide is removed by distillation, leaving a practically quantitative yield of white solid residue of $B_{10}H_{12} \cdot 2S(CH_3)_2$. The compound is crystallized from ethyl acetate and it melts at 122–124° C. The compound is called bis(dimethylsulfide)decaborane(12).

B. *Preparation of $(NH_4)_2B_{10}H_{10}$*

Bis(dimethylsulfide)decaborane(12) (8.5 g.) is mixed with 50 ml. of liquid ammonia and stirred in a round-bottom reaction vessel for one hour with the vessel being cooled to a temperature of about −50° C. by partial immersion in a mixture of solid carbon dioxide and acetone. The cooling bath is then removed and the excess ammonia is allowed to evaporate while the solution is stirred. The remaining traces of ammonia are removed by subjecting the residue to a high vacuum (0.01 mm. of mercury) at 25° C. There is obtained 5.6 g. of solid residue which is a virtually quantitative yield of diammonium decahydrododecaborate (2−), i.e., $(NH_4)_2B_{10}H_{10}$.

C. *Preparation of $B_{10}H_8 \cdot 2N_2$*

Two solutions are prepared consisting of (1) 65 ml. of water and 18 g. of NaNO$_2$ and (2) 200 ml. of water and 20 g. of $(NH_4)_2B_{10}H_{10}$. Both solutions are chilled to below 15° C. and they are combined. A solution (65 ml.) of 12% hydrochloric acid is chilled to below 15° C. and added to the combined solution with stirring and cooling to keep the temperature low. The dark reaction mixture is filtered and excess zinc and hydrochloric acid is added to the filtrate. The solid which forms and unreacted zinc are separated by filtration and the crude solid is extracted with ethanol to separate the boron compound from zinc. The ethanol extract is diluted with water and the solid which precipitates is separated by filtration to obtain 1.8 g. of $B_{10}H_8 \cdot 2N_2$. The infrared spectrum of the compound shows strong absorption bands at 4.0$\mu$ and 4.5$\mu$.

EXAMPLE I

A. A reaction vessel is charged with 2.0 g. of $B_{10}H_8 \cdot 2N_2$, and 30 ml. of hydrazine (95+% purity). Nitrogen gas is passed into the vessel to maintain an inert atmosphere and the mixture is refluxed for 1 hour. Insoluble material which forms is separated by filtration and the filtrate is evaporated to dryness under reduced pressure. A gummy solid remains which is recrystallized twice from water to obtain, as a white crystalline product, hydrazine-ammonia-decaborane(8), i.e., a compound of the formula $NH_2NH_2 \cdot B_{10}H_8 \cdot NH_3$. The identity of the compound is confirmed by elemental analysis.

*Analysis.*—Calcd. for $NH_2NH_2 \cdot B_{10}H_8 \cdot NH_3$: B, 65.5; N, 25.5. Found: B, 64.3; N, 22.1.

B. The process of part A is repeated, employing 1.0 g. of $B_{10}H_8 \cdot 2N_2$ and 25 ml. of hydrazine (95+% purity). The solid product remaining after evaporation of the reaction mixture is crystallized once from water to obtain $NH_2NH_2 \cdot B_{10}H_8 \cdot NH_3$ containing hydrazine of crystallization.

EXAMPLE II

A reaction vessel is charged with 6.0 g. of $B_{10}H_8 \cdot 2N_2$ and 60 ml. of hydrazine (97+% purity). The mixture is refluxed in a nitrogen atmosphere for 2½ hours. The mixture is processed as described in Example I and the crude product which is obtained is recrystallized five times from water to obtain pure $NH_2NH_2 \cdot B_{10}H_8 \cdot NH_3$.

*Analysis.*—Calcd. for $NH_2NH_2 \cdot B_{10}H_8 \cdot NH_3$: B, 65.5; H, 9.1; mol. wt., 165. Found: B, 64.8, 65.0; H, 9.5; mol. wt., 166 (X-ray), 155 (F.P. depression).

The infrared spectrum of an aqueous solution of the compound of Example II shows the following absorption bands (expressed as microns): 2.8, medium; 2.85, medium; 3.1, strong; 3.2, strong; 4.0, strong; 6.25, strong; 6.3, strong; 7.0, strong; 8.0, medium; 8.2, strong; 8.8, medium; 8.9, medium; 9.0, medium; 10.0, weak; 10.7–11.0, medium; 12.5, weak; and 14.5, weak.

The compound of Example II is dissolved in hydrazine to form clear solutions, e.g., 0.5 g. of the compound is dissolved in 99.5 g. of hydrazine to obtain a 0.5% solution, 25 g. of the compound is dissolved in 75 g. of hydrazine to obtain a 25% solution and equal parts by weight of the compound and hydrazine are mixed to form a 50% solution.

EXAMPLE III

A mixture of 4.6 g. $B_{10}H_8 \cdot 2N_2$ and 55 ml. of hydrazine (95+% purity) is refluxed 1 hour in a nitrogen atmosphere. The mixture is processed as described in Example I to obtain a viscous liquid residue. Water (2 ml.) is added to the residue and it solidifies. The crude product is crystallized once from water to obtain $NH_2NH_2 \cdot B_{10}H_8 \cdot NH_3$ containing 1 mole of hydrazine of solvation.

*Analysis.*—Calcd. for $(NH_2NH_2 \cdot B_{10}H_8 \cdot NH_3) \cdot N_2H_4$: B, 54.8; N, 35.5; H, 9.7. Found: B, 51.6; N, 34.0; H, 9.4.

The solvated product, obtained above, is repeatedly crystallized from water to obtain a solvate-free compound, i.e., $NH_2NH_2 \cdot B_{10}H_8 \cdot NH_3$.

EXAMPLE IV

The compound obtained in Example I, part A, is dissolved in aqueous sodium hydroxide solution (ca. 5%) to obtain $Na(NH_2NH)B_{10}H_8 \cdot NH_3$, in solution. An aqueous solution of $TlNO_3$ is added to the reaction mixture with stirring. The precipitate which forms is separated by filtration to obtain $Tl(NH_2NH)B_{10}H_8 \cdot NH_3$.

*Analysis.*—Calcd. for $Tl(N_2H_3)B_{10}H_8 \cdot NH_3$: B, 29.3. Found: B, 28.1.

The sodium salt, obtained in the first step in the process of Example IV can be isolated by evaporation of the solution. The lithium, potassium, rubidium and cesium salts can be obtained by using lithium hydroxide, potassium hydroxide, rubidium hydroxide and cesium hydroxide in place of sodium hydroxide in Example IV and evaporating the solutions so obtained to a point where separation of the solid product occurs. The salts are white hygroscopic compounds of the formulas $$Li(NH_2NH)B_{10}H_8 \cdot NH_3$$
$$K(NH_2NH)B_{10}H_8 \cdot NH_3, \quad Rb(NH_2NH)B_{10}H_8 \cdot NH_3 \text{ and}$$
$$Cs(NH_2NH)B_{10}H_8 \cdot NH_3$$

The compound $NH_2NH_2 \cdot B_{10}H_8 \cdot NH_3$ and its solutions in hydrazine are useful as components of high energy fuels for rocket motors. The hydrazine solutions are fluids and they can be used as liquid fuels or monopropellants in liquid propulsion motors. The compositions can be used, if desired, in conjunction with oxidizing agents, e.g., nitrogen tetroxide, fluorine oxide and the like, to provide fuels of high specific impulse and heat of combustion.

The compound $NH_2NH_2 \cdot B_{10}H_8 \cdot NH_3$ and its alkali metal and thallium salts are useful as components of fireworks compositions to impart a pleasing color and sparkle to the display.

The compound, $NH_2NH_2 \cdot B_{10}H_8 \cdot NH_3$, its hydrazine solutions and its salts as defined above, are useful as impregnating agents in the preparation of resistors. To illustrate, a section of cotton string can be immersed in a solution of $NH_2NH_2 \cdot B_{10}H_8 \cdot NH_3$ or any of its salts for a short period, then withdrawn and dried in air. The dried and impregnated string will burn freely when ignited to yield a coherent ash which in size and shape resembles the original string. The residual skeleton can be embedded in paraffin and the residue, so treated, shows a high resistance to passage of electrical current.

As many apparently widely different embodiments of this invention may be made without departing from the spirit and scope thereof, it is to be understood that this invention is not limited to the specific embodiments thereof except as defined in the appended claims.

The embodiments of this invention in which an exclusive property or privilege is claimed are defined as follows:

1. A compound selected from the class consisting of $NH_2NH_2 \cdot B_{10}H_8 \cdot NH_3$, $NH_2NH_2 \cdot B_{10}H_8 \cdot NH_3$ having hydrazine of crystallization, and $M(NH_2NHB_{10}H_8 \cdot NH_3)_b$ wherein M is a metal cation and $b$ is the valence of said cation.

2. $NH_2NH_2 \cdot B_{10}H_8 \cdot NH_3$.

3. $NH_2NH_2 \cdot B_{10}H_8 \cdot NH_3$ having hydrazine of crystallization.

4. A compound of the formula $$M(NH_2NHB_{10}H_8 \cdot NH_3)_b$$

wherein M is a metal cation and $b$ is the valence of said cation.

5. A compound of the formula $$M(NH_2NHB_{10}H_8 \cdot NH_3)$$

wherein M is a cation selected from the class consisting of alkali metals, and thallium.

6. $Na(NH_2NH)B_{10}H_8 \cdot NH_3$.

7. A composition comprising $NH_2NH_2 \cdot B_{10}H_8 \cdot NH_3$ and hydrazine.

8. A composition comprising $M(NH_2NHB_{10}H_8 \cdot NH_3)$ and hydrazine, M being a cation of the class consisting of alkali metals and thallium.

9. Process for preparing $NH_2NH_2 \cdot B_{10}H_8 \cdot NH_3$ which comprises reacting $B_{10}H_8 \cdot 2N_2$ with hydrazine in an inert atmosphere.

10. Process which comprises reacting $B_{10}H_8 \cdot 2N_2$ with hydrazine in an inert atmosphere until the $N_2$ groups are replaced and a solution of $NH_2NH_2 \cdot B_{10}H_8 \cdot NH_3$ in hydrazine is obtained.

11. Process of claim 9, followed by the step of evaporation of the hydrazine solvent to obtain a compound selected from the class consisting of $NH_2NH_2 \cdot B_{10}H_8 \cdot NH_3$ and $NH_2NH_2 \cdot B_{10}H_8 \cdot NH_3$ having hydrazine of crystallization.

12. Process for preparing compounds of the formula $M(NH_2NHB_{10}H_8 \cdot NH_3)$ wherein M is a cation selected from the class consisting of alkali metals and thallium which comprises reacting $NH_2NH_2 \cdot B_{10}H_8 \cdot NH_3$ with a compound selected from the class consisting of alkali metal hydroxide and thallium hydroxide.

References Cited by the Examiner

UNITED STATES PATENTS

| | | | |
|---|---|---|---|
| 3,140,582 | 7/1964 | Tyson | 149—22 |
| 3,149,010 | 9/1964 | Armstrong | 149—36 |
| 3,169,045 | 2/1965 | Miller | 149—22 |
| 3,219,499 | 11/1965 | Graham | 149—22 |
| 3,228,814 | 1/1966 | Jenkins et al. | 149—36 |

FOREIGN PATENTS 3,141,295   7/1964   Canada.

BENJAMIN R. PADGETT, *Primary Examiner.*

S. J. LECHERT, *Assistant Examiner.*